(12) United States Patent
Anderson

(10) Patent No.: US 10,942,576 B2
(45) Date of Patent: Mar. 9, 2021

(54) TECHNIQUES FOR REAL OBJECT AND HAND REPRESENTATION IN VIRTUAL REALITY CONTENT

(71) Applicant: INTEL CORPORATION, Santa Clara, CA (US)

(72) Inventor: Glen J. Anderson, Beaverton, OR (US)

(73) Assignee: INTEL CORPORATION, Santa Clara, CA (US)

( * ) Notice: Subject to any disclaimer, the term of this patent is extended or adjusted under 35 U.S.C. 154(b) by 0 days.

(21) Appl. No.: 16/046,126

(22) Filed: Jul. 26, 2018

(65) Prior Publication Data

US 2019/0025931 A1    Jan. 24, 2019

Related U.S. Application Data

(63) Continuation of application No. 14/977,268, filed on Dec. 21, 2015, now Pat. No. 10,037,085.

(51) Int. Cl.
*G06F 3/01*  (2006.01)
*G06T 19/00*  (2011.01)
*G06F 3/03*  (2006.01)
*G06F 3/0346*  (2013.01)
*G02B 27/00*  (2006.01)
*G02B 27/01*  (2006.01)

(52) U.S. Cl.
CPC ......... *G06F 3/017* (2013.01); *G02B 27/0093* (2013.01); *G02B 27/017* (2013.01); *G02B 27/0172* (2013.01); *G06F 3/011* (2013.01); *G06F 3/0304* (2013.01); *G06F 3/0346* (2013.01); *G06T 19/006* (2013.01); *G02B 2027/0138* (2013.01)

(58) Field of Classification Search
CPC ...... G06F 3/017; G06F 3/0304; G06F 3/0346; G06F 3/011; G06T 19/006; G02B 27/017; G02B 27/0172; G02B 27/0093
See application file for complete search history.

(56) References Cited

U.S. PATENT DOCUMENTS

| | | | | |
|---|---|---|---|---|
| 6,507,365 | B1 * | 1/2003 | Nakamura | H04N 5/2357 348/296 |
| 2008/0218515 | A1 * | 9/2008 | Fukushima | G06T 19/006 345/424 |
| 2010/0164953 | A1 * | 7/2010 | Wouhaybi | G06F 3/002 345/420 |
| 2010/0245237 | A1 * | 9/2010 | Nakamura | A63F 13/285 345/156 |
| 2011/0037784 | A1 * | 2/2011 | Shiomi | G09G 3/3426 345/690 |
| 2015/0054734 | A1 * | 2/2015 | Raghoebardajal | G06F 3/017 345/156 |

(Continued)

*Primary Examiner* — Ariel A Balaoing
(74) *Attorney, Agent, or Firm* — Kacvinsky Daisak Bluni PLLC

(57) ABSTRACT

Examples include techniques for real object and hand representation in virtual reality content. In some examples, one or more hands of a user of a head-mounted display (HMD) may be tracked while receiving sensor data from an identified object including one or more embedded sensors. Virtual reality content visible to the user on the HMD may be modified based on the tracking of the one or more hands and based on the received sensor data.

23 Claims, 10 Drawing Sheets

(56) References Cited

U.S. PATENT DOCUMENTS

| | | | |
|---|---|---|---|
| 2015/0258431 A1* | 9/2015 | Stafford | A63F 13/213 |
| | | | 463/31 |
| 2015/0258432 A1* | 9/2015 | Stafford | A63F 13/213 |
| | | | 463/32 |
| 2016/0041391 A1* | 2/2016 | Van Curen | G02B 27/0172 |
| | | | 345/633 |
| 2016/0129346 A1* | 5/2016 | Mikhailov | A63F 13/285 |
| | | | 463/33 |
| 2016/0171771 A1* | 6/2016 | Pedrotti | G02B 27/017 |
| | | | 345/633 |
| 2016/0330508 A1* | 11/2016 | Newell | G06Q 50/01 |
| 2016/0349835 A1* | 12/2016 | Shapira | G06F 3/011 |
| 2016/0363996 A1* | 12/2016 | Higgins | G06F 3/0346 |
| 2017/0140552 A1* | 5/2017 | Woo | G06F 1/163 |
| 2018/0067545 A1* | 3/2018 | Provancher | G06F 3/011 |
| 2018/0293942 A1* | 10/2018 | Gu | G09G 5/005 |

\* cited by examiner

800

IDENTIFY AN OBJECT HAVING ONE OR MORE EMBEDDED SENSORS
802

TRACK ONE OR MORE HANDS OF A USER WEARING AN HMD
804

PRESENT AN IMAGE OR REPRESENTATION OF THE ONE OR MORE HANDS AND THE OBJECT IN VR CONTENT VISIBLE TO THE USER ON THE HMD BASED ON IDENTIFICATION OF THE OBJECT AND THE TRACKING OF THE ONE OR MORE HANDS
806

RECEIVE SENSOR DATA FROM THE ONE OR MORE EMBEDDED SENSORS THAT INDICATES THE OBJECT, AT LEAST TEMPORARILY, IS NOT IN DIRECT CONTACT WITH THE ONE OR MORE HANDS
808

USE THE SENSOR DATA AND TRACKING OF THE ONE OR MORE HANDS TO DETERMINE AN INPUT TO CAUSE THE VR CONTENT VISIBLE TO THE USER ON THE HMD TO BE MODIFIED
810

FIG. 8

Storage Medium 900

Computer Executable
Instructions for 800

*FIG. 9*

TECHNIQUES FOR REAL OBJECT AND HAND REPRESENTATION IN VIRTUAL REALITY CONTENT

CROSS-REFERENCE TO RELATED APPLICATIONS

This patent application is a continuation of U.S. patent application Ser. No. 14/977,268 filed Dec. 21, 2015, the subject matter of which is incorporated herein by reference in its entirety.

TECHNICAL FIELD

Examples described herein are generally related to techniques for hand and object representation in virtual reality content.

BACKGROUND

Rapid technological advancements with head-mounted displays (HMDs) or heads-up displays (HUD) to present virtual reality (VR) or augmented reality content to a user wearing an HMD or HUD have been made in recent years. These rapid technological advancements as well as reduction in costs for users to purchase HMDs or HUDs may soon lead to an explosion in the use of these types of displays and the various applications for which HMDs or HUDs may be utilized to present VR or augmented reality content. Applications may vary from gaming applications, workplace enhancements, immersive video viewing, shopping applications, etc.

BRIEF DESCRIPTION OF THE DRAWINGS

FIG. 8 illustrates an example second logic flow.
FIG. 9 illustrates an example of a storage medium.

DETAILED DESCRIPTION

As contemplated by in this disclosure, head-mounted displays (HMDs) or heads-up displays (HUDs) may be used for various types of applications. Some types of applications may benefit or have an improved user experience if a wide range of interaction may occur with the user wearing an HMD that presents virtual reality (VR) content to the user. For example, gaming applications may benefit from a range of different input mechanisms that may allow for a user to interact with VR content that may be presented 2-dimentionally or 3-dimentionally. Voice commands, body movements or gesture recognition may be ways to cause inputs to a computing device receiving these inputs, the computing device may then render or present VR content on the HMD. A computing device arranged to receive inputs and render or present VR content for display on an HMD is hereinafter referred to as an HMD device. For example, a real or physical object may have input mechanisms that may serve as inputs to cause modifications to VR content on the HMD.

In some example, HMDs may display VR content in a manner that is fully immersive. In other words, the user of the HMD may wear the HMD such that almost all of the vision of the user is taken up by the HMD. Almost all of the vision being taken up by the HMD may result in the user having no view of their hands while viewing and/or interacting with VR content. No view of the user's hand may be limiting for the user to interact with real objects and/or using these real objects for inputs to modify VR content while wearing the HMD. Limitations may exist for interacting with real objects when those real objects, at least temporarily, are not in direct contact with one or more of the user's hands or the user has a need to interact with portions of the real object. For example, if the user throws or tosses the real object in the air then not seeing their hands would make it difficult to catch the real object. Also, not being able to see the object may also make it difficult to interact with particular portions of the real object. Thus, the user may be limited to always maintaining direct contact with the real object or maintaining the object in a consistent orientation when wearing a fully immersive HMD. It is with respect to the above-mentioned and other challenges that the examples described herein are needed.

Figure 1:
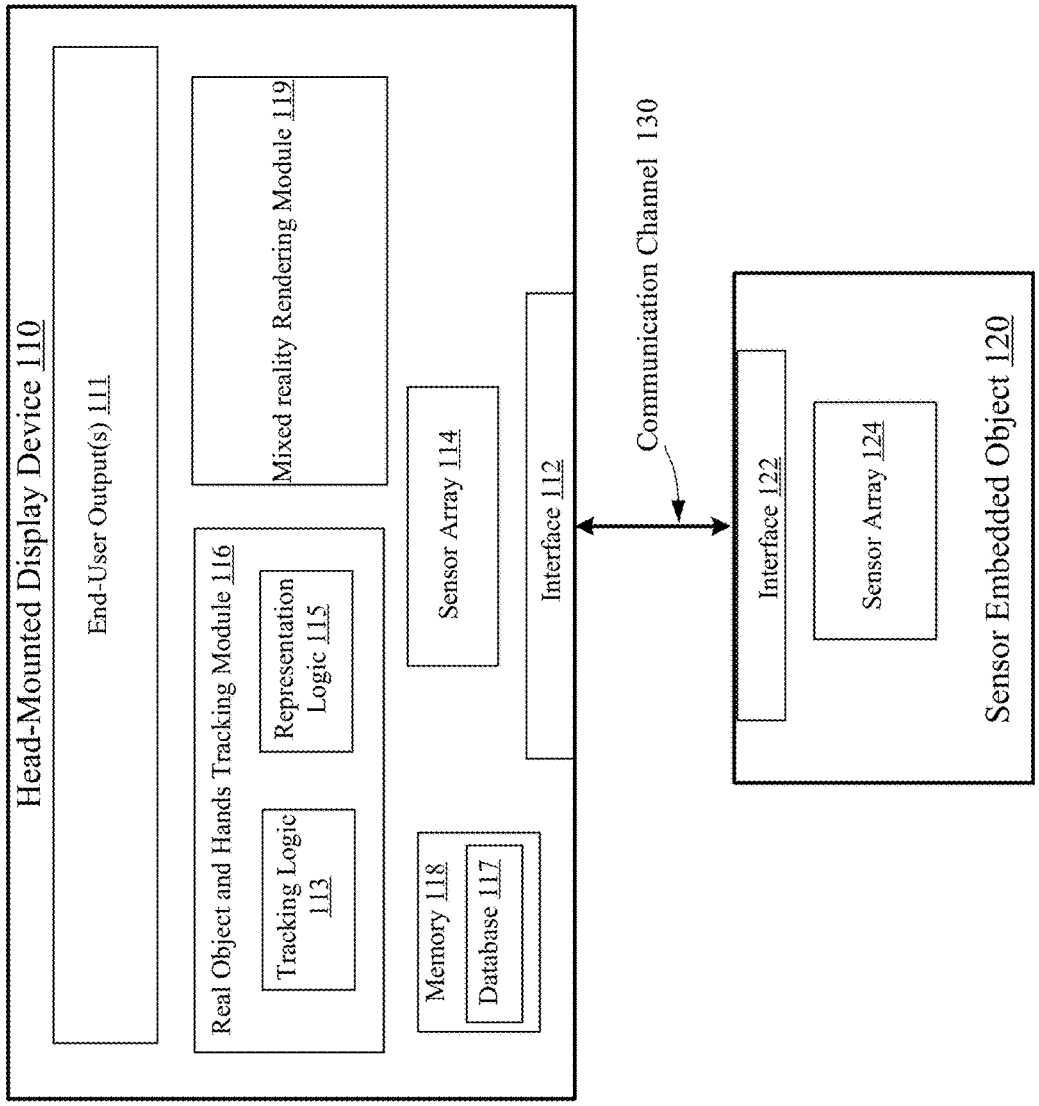
FIG. 1 illustrates an example first system.

FIG. 1 illustrates an example system 100. In some examples, as shown in FIG. 1, system 100 includes a head-mounted display (HMD) device 110 and a sensor embedded object 120 coupled in communication via a communication channel 130.

In some examples, as shown in FIG. 1, HMD device 110 includes a real object and hands tracking module 116. Real object and hands tracking module 116, as described in more detail below, may include logic and/or features such as tracking logic 113 and representation logic 115 to identify an object such as sensor embedded object 120, track one or more hands of a user wearing HMD device 110, present the one or more hands and object in VR content visible to the user on a display of HMD device 110, receive sensor data and use the sensor data and tracking of the one or hands to determine an input to cause the VR content visible to the user on the display of HMD device 110 to be modified.

According to some examples, as shown in FIG. 1, HMD device 100 may include end-user output(s) 111. End-user output(s) 111 may include the display portion of HMD device 100. End-user outputs(s) 111 may also include speakers and/or bone conducting speakers to provide audio output for VR content presented to a user. End-user output(s) 111 may also include tactile types of output such as haptic feedback to provide tactile output for VR content presented to a user. Examples are not limited to the above mentioned types of end-user outputs. More or less types of end-user outputs are contemplated for an HMD device such as HMD device 100.

In some examples, as shown in FIG. 1, HMD device 100 may include an interface 112 via which communication channel 130 may be established with sensor embedded object 120 through an interface 122 at sensor embedded object 120. Interface 112 and interface 122 may be arranged to operate in accordance with one or more wired and/or wireless communication standards to establish a wired or wireless communication channel 130. For example, a wireless communication channel 130 may be arranged to operate in accordance with wireless standards or specifications such as, but not limited to, Bluetooth®, wireless Ethernet or ZigBee® wireless specifications. A wired communication channel 130 may be arranged to operate in accordance with wired standards or specifications such as, but not limited to, universal serial bus (USB) or Peripheral Component Interconnect (PCI) Express or wired Ethernet specifications. As described more below, logic and/or features of real object and hands tracking module 116 may be able to receive identification information as well as sensor data from sensor embedded objects through an established communication channel 120.

According to some examples, as shown in FIG. 1, HMD device 110 may also include a sensor array 114. Sensor array 114 may include various types of sensors to include, but not limited to, motion sensors (e.g., accelerometer), direction sensors (e.g., gyroscope), audio sensors (e.g., microphone), image sensors (e.g., cameras), proximity sensors or capacitive sensors. Also, sensor array 124 included in sensor embedded object 120 may include at least one motion sensor, direction sensor, audio sensor, image sensor, proximity sensor or capacitive sensor. As described in more detail below, these types of sensors included in a sensor embedded object may generate sensor data for use in determining an input to cause VR content visible to a user of HMD device 110 to be modified.

In some examples, as shown in FIG. 1, HMD device 110 may include a memory 118. Memory 118 may be arranged to maintain a database 117. Database 117 may include real event to virtual event information to match hand tracking of a user of HMD device 110 with an object event to determine inputs to modify VR content presented to the user. According to some examples, based on received sensor data from sensor embedded object 120 an object event may be indicated. For these examples, as described more below, database 117 may be used to match hand tracking of the user with that object event to determine an input to modify the VR content presented to the user. For example, depending on the application or usage scenario (e.g., type of gaming application) various object events matched with hand tracking information may have corresponding inputs to modify the VR content.

Memory 118 arranged to maintained database 117 may include volatile types of memory such as dynamic random access memory (DRAM), non-volatile types of memory such as flash, NAND or 3-dimensional cross-point memory, or a storage device having volatile and/or non-volatile types of memory (e.g., a solid state drive or a hard disk drive).

According to some examples, as shown in FIG. 1, HMD device 110 may also include a mixed reality rendering module 119. Mixed reality rendering module 119 may gather tracking information, sensor data and input determinations to cause a captured image of the user's hand(s) or a representation of the user's hand(s) to be presented with the VR content. Mixed reality rendering module 119 may also cause a captured image of the object or a representation of the object to be presented along with the image or representation of the user's hand(s) with the VR content. In some examples, based on various object events being matched with hand tracking information by logic and/or features of real object and hands tracking module 116, mixed reality rendering module 119 may modify the VR content visible to the user via end-user output(s) 111. For example, visible on a display included in end-user output(s) 111.

Figure 2:
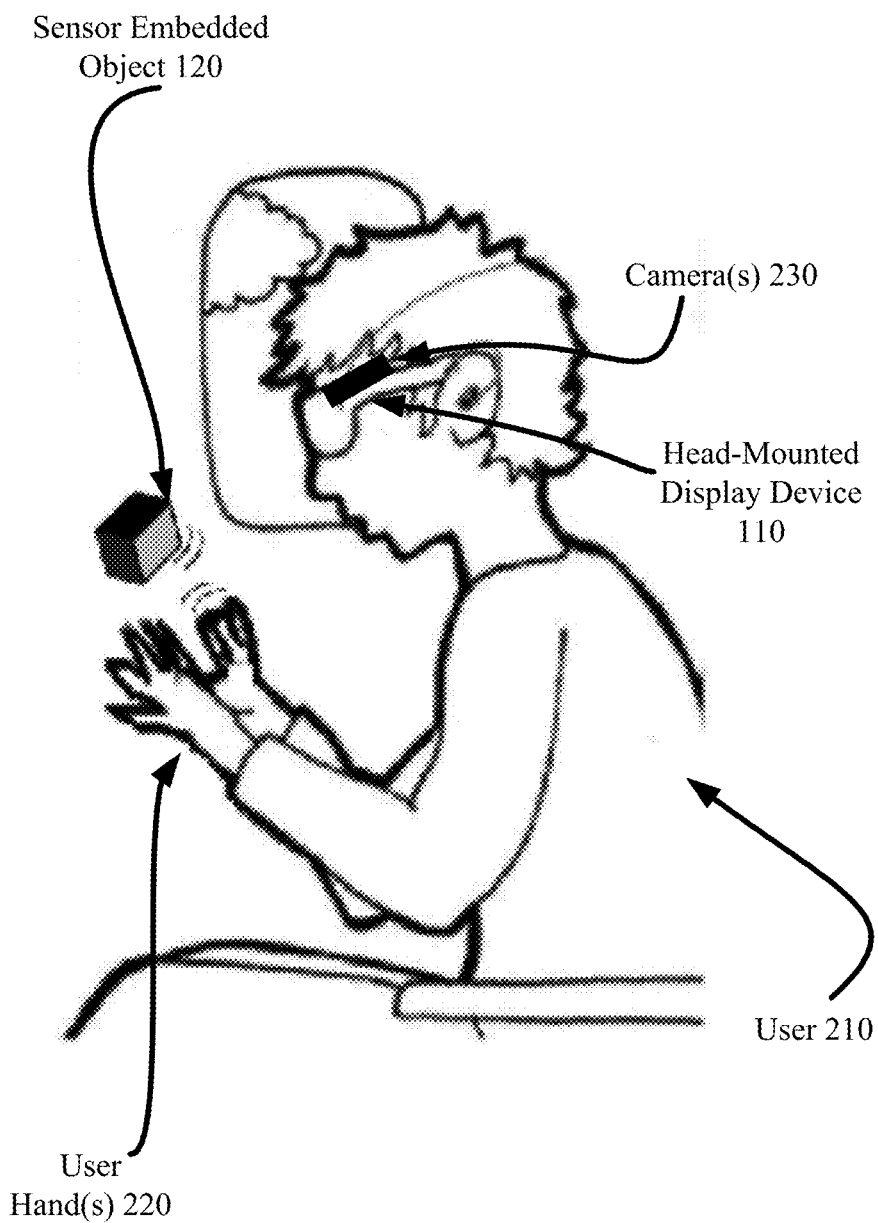
FIG. 2 illustrates an example second system.

FIG. 2 illustrates an example system 200. In some examples, as shown in FIG. 2, system 200 includes a user 210 wearing HMD device 110 while interacting with sensor embedded object 120. For these examples, one or more user hand(s) 220 may be used by user 210 to interact with sensor embedded object 120. Also, one or more camera(s) 230 may be mounted on an outer service of a housing for HMD device 110 to enable logic and/or features of HMD device 110 (e.g., tracking logic 113) to track user hand(s) 220 while interacting with sensor embedded object 120. In other examples, in addition to or excluding the use or camera(s) 230, other sensors located at HMD device 110 may be used to track user hand(s) 220. For example, sensors may be located on user hand(s) 220 (e.g., sensor embedded gloves) and sensors located at HMD device 110 may be arranged to track the location of user hands based on sensor data received from these sensors.

Figure 3:
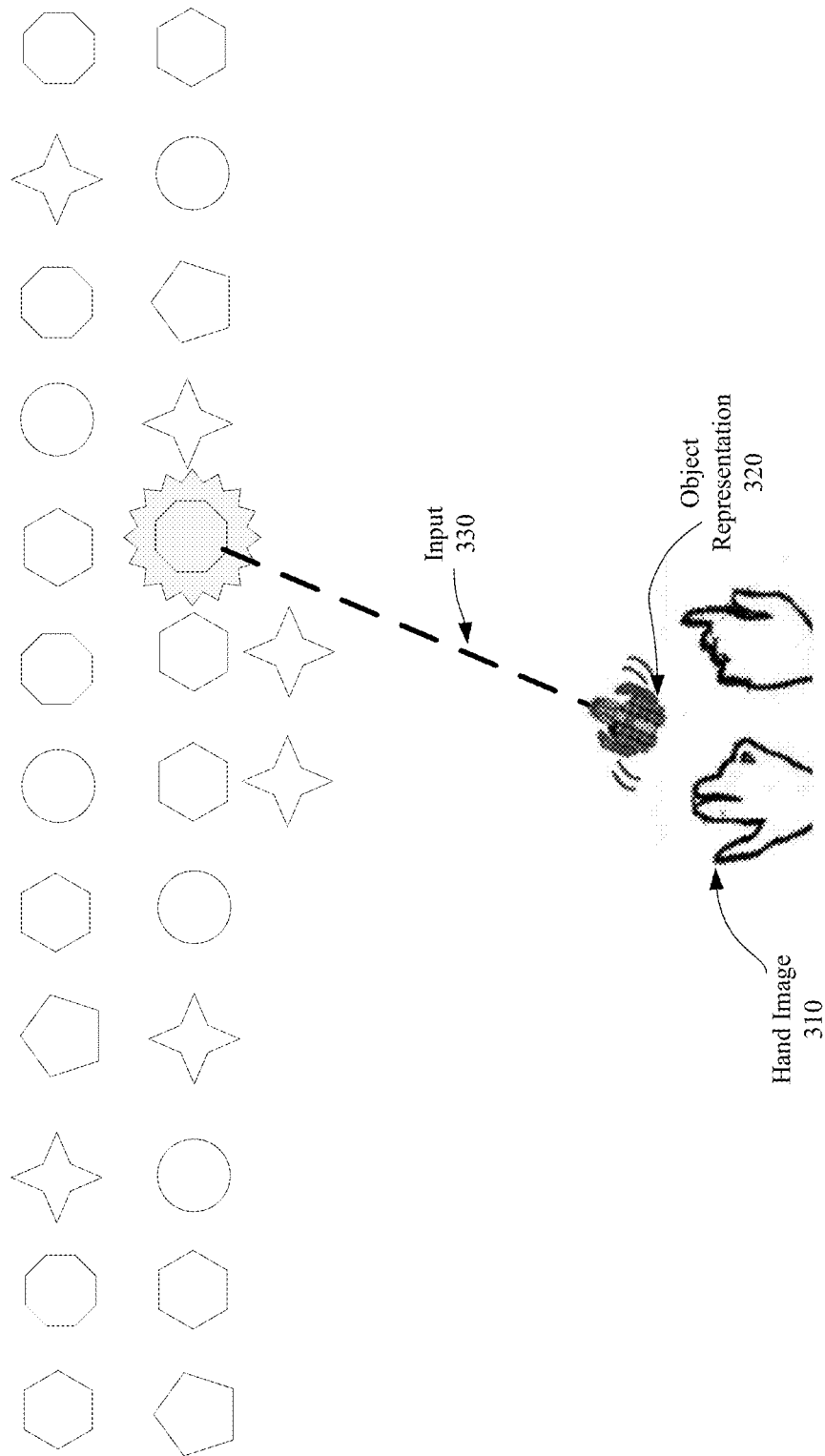
FIG. 3 illustrates an example first user point of view.

FIG. 3 illustrates an example user point of view 300. In some examples, user point of view 300 may be a view of VR content for a gaming application visible to a user of an HMD device such as HMD device 110 shown in FIGS. 1 and 2. For these examples, as shown in FIG. 3, a hand image 310 of the user of the HMD device may be included in user point of view 300 as well as an object representation 320. Object representation 320 may be a first representation of a real object having embedded sensors such as sensor embedded object 120. That first representation, as shown in FIG. 3, may be a rocket ship included in the VR content. Also, as described more below, an input 330 may be determined by logic and/or features of the HMD device based on matching hand tracking with an object event indicated by sensor data.

Figure 4:
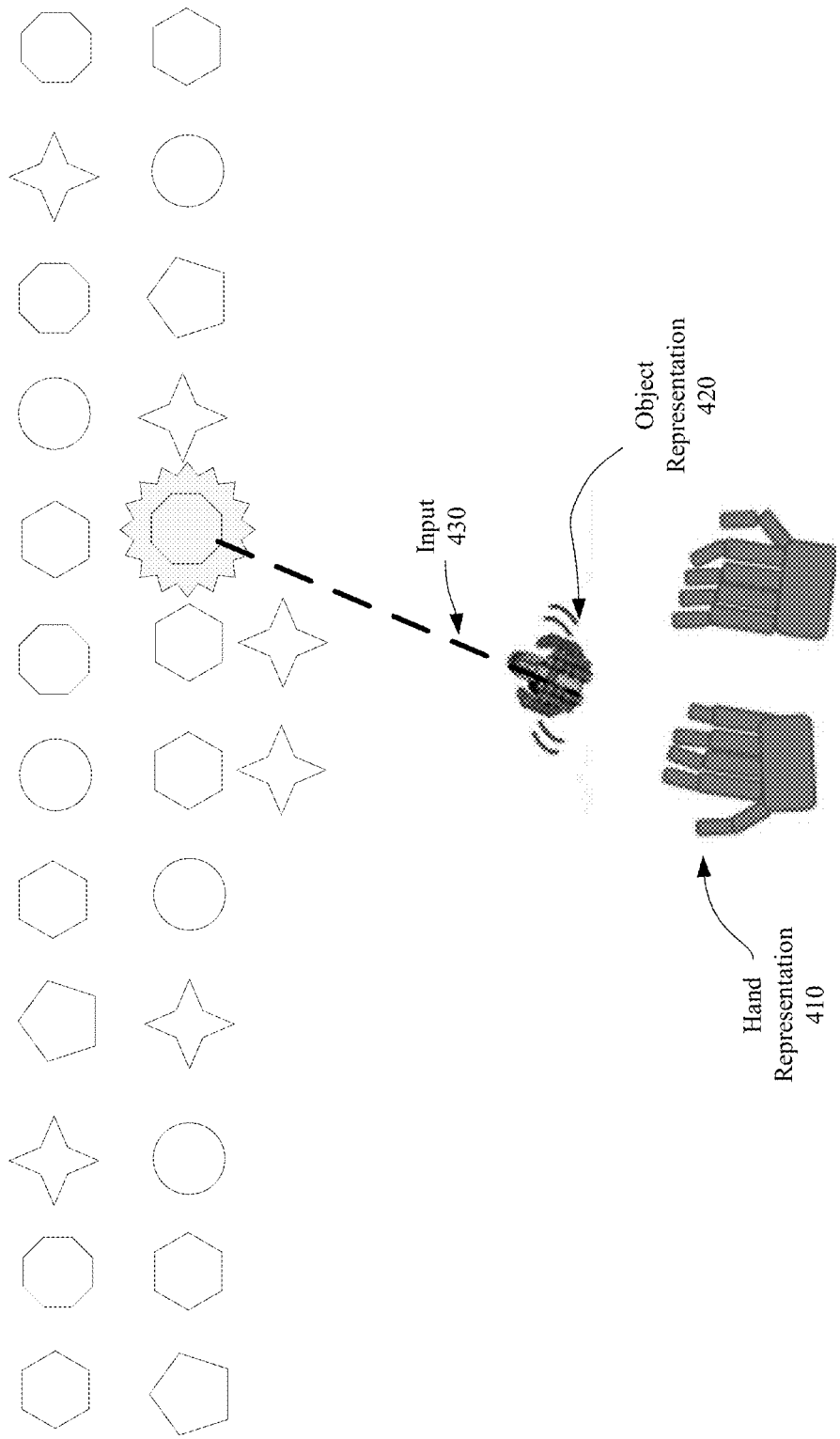
FIG. 4 illustrates an example second user point of view.

FIG. 4 illustrates an example user point of view 400. In some examples, user point of view 400 may be a slightly different view compared to user point of view 300 shown in FIG. 3 of VR content for a gaming application visible to a user of an HMD device. For these examples, as shown in FIG. 4, rather than a hand image, a hand representation 410 is shown that represents hands of the user of the HMD device as part of the VR content. Object representation 420 may be the same first representation (e.g., a rocket ship) of the real object as shown in FIG. 3. Also, as described more below, an input 430 may be determined by logic and/or features of the HMD device based on matching hand tracking with an object event indicated by sensor data.

Figure 5:
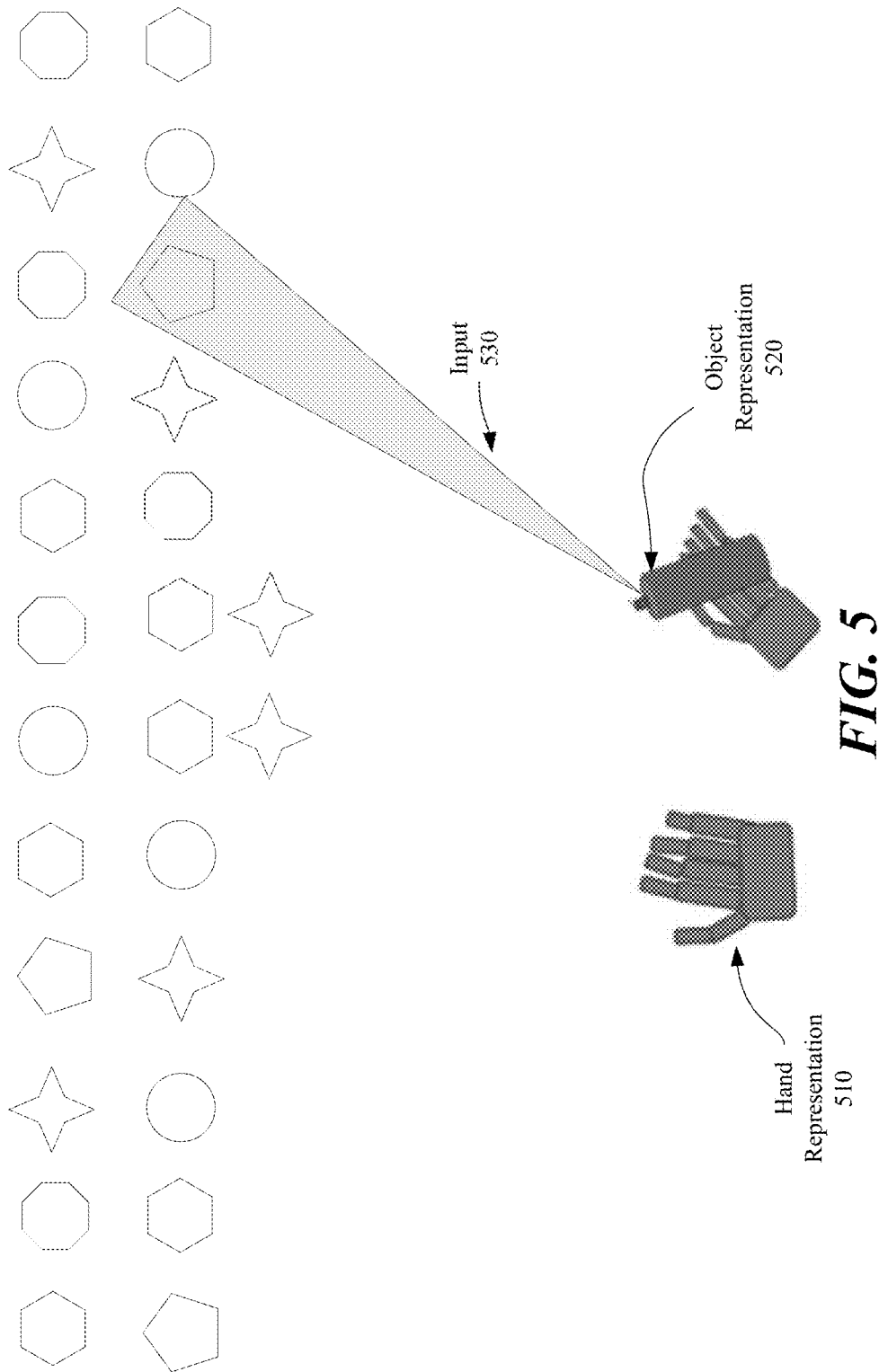
FIG. 5 illustrates an example third user point of view.

FIG. 5 illustrates an example user point of view 500. In some examples, user point of view 400 may be a view of VR content for a gaming application visible to a user of an HMD device such as HMD device 110 shown in FIGS. 1 and 2. For these examples, as shown in FIG. 4, a hand representation 510 of the user of the HMD device may be included in user point of view 500 as well as an object representation 520. Object representation 520 may be a second representation of the real object having embedded sensors such as sensor embedded object 120. This second representation, as shown in FIG. 3, may be a spray can included in the VR content. Also, as described more below, an input 530 may be determined by logic and/or features of the HMD device based on matching hand tracking with an object event indicated by sensor data.

Figure 6:
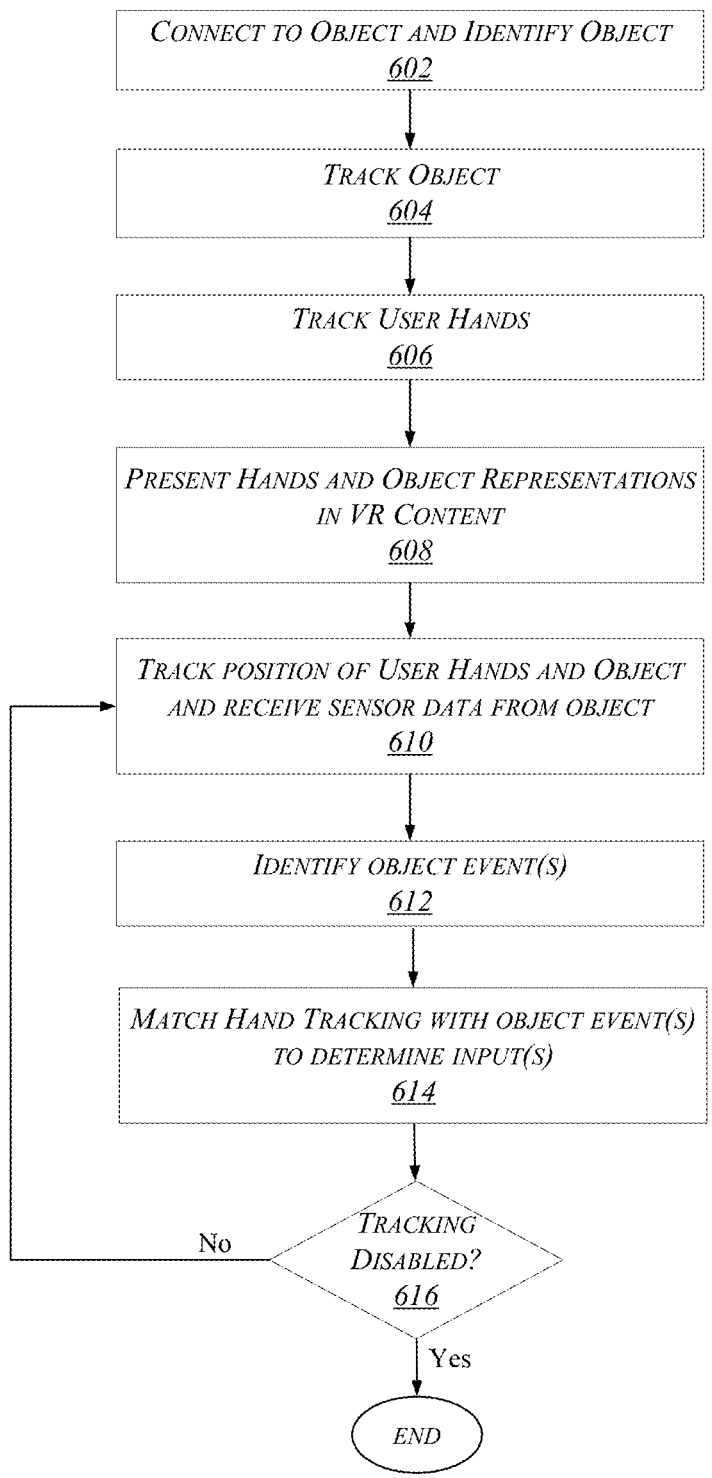
FIG. 6 illustrates an example first logic flow.

FIG. 6 illustrates an example logic flow 600. In some examples, logic flow 600 may be implemented by logic and/or features of an HMD device such as HMD device 110 shown in FIGS. 1 and 2. Also, user point of views 300-500 shown in FIGS. 3-5 may indicate examples of modified VR content. Logic flow 600 is not limited to implementation by logic and/or features of HMD device 110 or to the user point of views shown in FIGS. 3-5.

At block 602, HMD device 110 may include logic and/or features to connect with object such as sensor embedded object 120 and identify that object. In some examples, identifying the object may include receiving identification information from the object via wired or wireless communication channel established with the object. For example, via communication channel 130.

According to some examples, identification information may include information to indicate number and types of embedded sensors the object may include. The identification information may also include information to indicate how the object is to be represented in VR content presented to a user of the HMD device. For example, as shown in user point of views 300 and 400 of FIGS. 3-4, the object is represented as a rocket ship and identification information may indicate that representation for the VR content. Alternatively, as shown in user point of view 500 of FIG. 5, the object is represented as a spray can and identification information may indicate that representation for the VR content.

At block 604, logic and/or features of HMD device 110 may track the identified object. In some examples, the object may be embedded sensor object 120 that may be tracked visually, e.g., by camera(s) 230 or may be tracked via received sensor data transmitted by embedded sensor object 120. The sensor data may include information to track the movement of embedded sensor object 120 in relation to user hand(s) 220 and/or in relation to HMD device 110.

At block 606, logic and/or features of HMD device 110 may track user hand(s) 220. In some examples, camera(s) 230 may capture image data and may forward that image data to logic and/or features of HMD device 110 such as tracking logic 113 to enable tracking logic 113 to track user hand(s) 220.

At block 608, logic and/or features of HMD device 110 may present hand(s) or object representations in VR content. In some examples, a captured image of hand(s) 220 may be presented in the VR content along with a representation of sensor embedded object 120 as shown in FIG. 3. In other examples, a representation of hand(s) 220 may be presented in the VR content along with a representation of sensor embedded object 120 as shown in FIGS. 4 and 5.

At block 610, logic and/or features of HMD device 110 may track positon of user hand(s) 220 and embedded sensor object 120 and receive sensor data from embedded sensor object 120. According to some examples, as mentioned previously, camera(s) 230 may gather image data that may be forwarded to tracking feature 113 to track the user hand(s) 220. Also sensor data received may be from at least one of a motion sensor, a direction sensor, an audio sensor, image sensor, a capacitive touch sensor, a proximity sensor or a pressure sensor. The sensor data, for example, may be received through a wireless communication channel 130 coupled with interface 112 of HMD device 110.

At block 612, one or more object events may be identified based on the received sensor data. In some examples, a first object event may be indicated by the sensor data that has embedded sensor object 120, at least temporarily, not in direct contact with user hand(s) 220. For example, as shown in FIG. 2, user 210 may have tossed embedded sensor object 120 in the air above user hand(s) 220. For this example, capacitive sensors on a surface of embedded sensor object 120 may have detected that a skin surface of user hand(s) 220 is not contacting the surface. In other examples, rather than capacitive sensors, 3-axis accelerometers sensor data generated from one or more motion sensors may indicate embedded sensor object 200 has been tossed. For example, when object 120 is in freefall, 3-axis accelerometer readings may get much closer to 0 and this may indicating tossing of the embedded sensor object 200. The logic and/or features of embedded sensor object 120, based on sensor data received from these capacitive sensors and/or motion sensors indicating no direct contact, may determine that this indicates the first object event.

According to some examples, other object events may also be determined based on sensor data received substantially concurrent with sensor data indicating no direct contact with user hand(s) 220. For example, embedded sensor object 120 may include motion or direction sensors to detect whether embedded sensor object 120 is moving or spinning around an axis running through the middle of embedded sensor object 120. The moving or spinning around the axis while not in direct contact with user hand(s) 220 may indicate a second object event.

In some examples, other object events may also be determined based on logic and/or features of HMD device 110 identifying a second object in addition to embedded sensor object 120. For these examples, embedded sensor object 120 may include one or more proximity sensors to detect whether the second object is within a given proximity (e.g., touching or within a given distance of a few millimeters). Logic and/or features of HMD device 110 may receive sensor data from the proximity sensors indicating the second object is within the given proximity to embedded sensor object 120. According to some examples, the sensor data may be received at a substantially same time as one or more capacitive touch sensor data indicates embedded sensor object 120 is not in direct contact with the one or more hands of the user. For example, user 210 may have directed a toss of embedded sensor object 120 towards the second object. The proximity detection to the second object while not in direct contact with user hand(s) 220 may indicate a second object event. In other examples, embedded sensor object 120 may still be in direct contact with user hand(s) 220 and a proximity detection to the second object may indicate the second object event.

According to some examples, other object events may be indicated based on received sensor data indicating that one or more pressure sensors included on embedded sensor object 120 are indicating pressure on a portion of embedded sensor object 120. For example, the one or more pressure sensors may indicate that user hand(s) 220 are squeezing or pressing on at least a portion of embedded sensor object 120. The logic and/or features of embedded sensor object 120, based on sensor data received from these pressure sensors indicating pressure on the portion of embedded sensor object 120, may determine that this indicates an object event.

Examples are not limited to object events determined based on indications of tossing, spinning, proximity of an embedded sensor object to other objects or pressure indications. Any number of object events may be determined based on received sensor data. For example, object events may be determined by indications of rapid movements of embedded sensor object 120 (e.g., rapid shaking), indications of changing orientation of embedded sensor object 120 or by captured audio/images that may be captured by audio/image sensors at embedded sensor object 120.

At block 614, logic and/or features of HMD device 110 may match hand tracking of user hand(s) 220 with determined object events to determine one or more inputs to modify VR content visible to user 210 on the HMD display. According to some examples, database 117 that includes real event to virtual event information may be used to determine the one or more inputs to modify the VR content. For example, if identification information indicates embedded sensor object 120 is to be represented as a spray can in VR content (see FIG. 5), database 117 may match a pressure-based object event detected by sensor data received by pressure sensors with hand tracking to result in a first input that causes the spray can to spray objects. For example, object representation 520 has an input 530 that spays an object included in VR content as shown in FIG. 5. In other words, the first input may cause the VR content visible to user 210 to be modified such that a first representation of the spray can (not spraying) presented in the VR content changes to a second representation of the spray can (spraying) based on the determined first input. Additional sensor data received from embedded sensor object 120 may cause any number of changes to its representation in the VR content based on mapping determined object events with hand tracking.

At decision block 616, the logic and/or features of HMD device 110 may determine whether tracking of at least user hand(s) 220 or embedded sensor object 120 has been disabled. The tracking may be disabled, for example, if user 210 terminates an application that utilized embedded sensor object 120 and user hand(s) 220 for causing inputs to the application that modified VR content. If the tracking was determined to be disabled, logic flow 600 comes to an end. Otherwise, logic flow 600 moves from decision block 616 to block 610.

Figure 7:
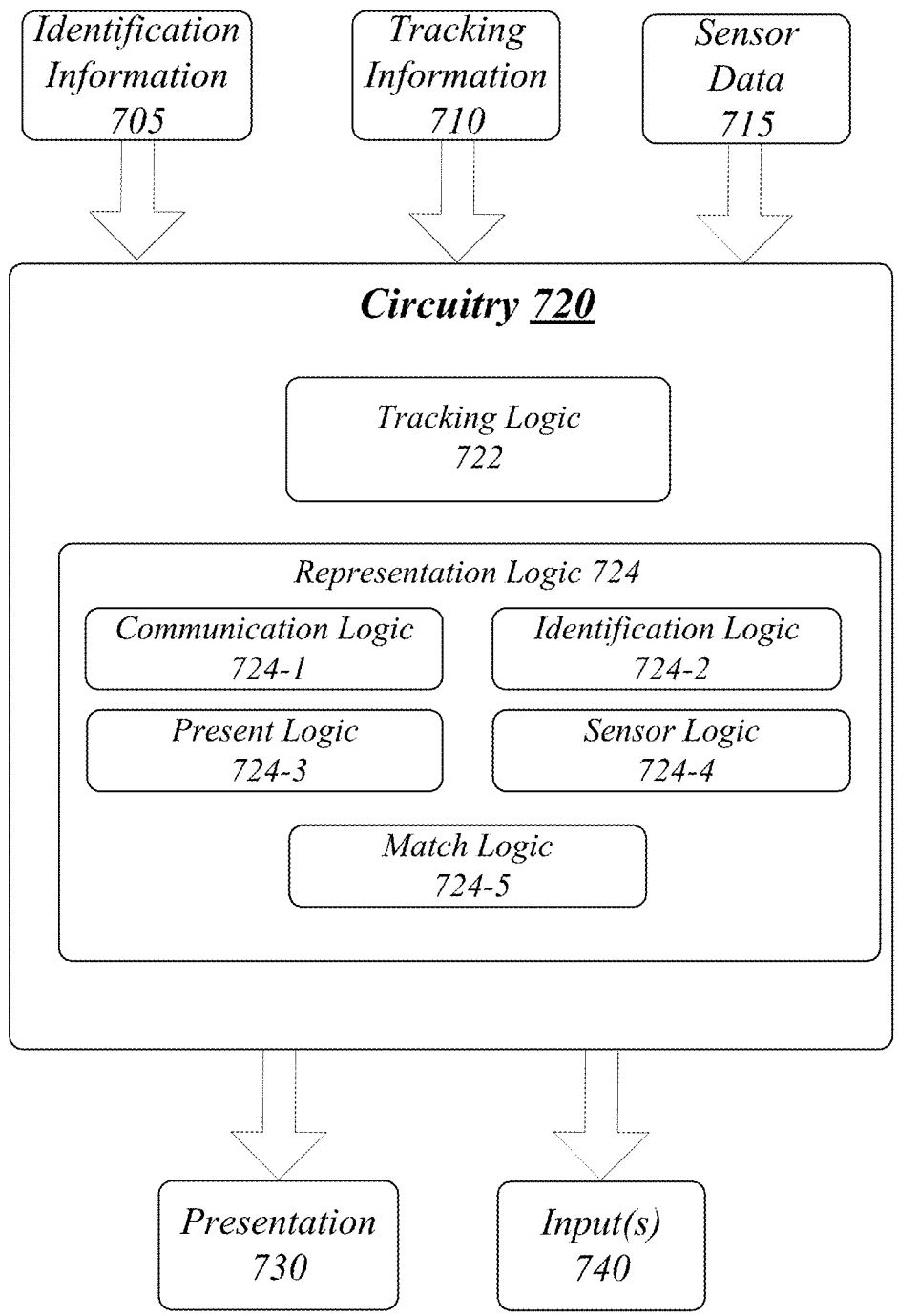
FIG. 7 illustrates an example block diagram for an apparatus.

FIG. 7 illustrates an example block diagram for an apparatus 700. Although apparatus 700 shown in FIG. 7 has a limited number of elements in a certain topology, it may be appreciated that the apparatus 700 may include more or less elements in alternate topologies as desired for a given implementation.

The apparatus 700 may be supported by circuitry 720 and apparatus 700 may be included in an HMD device such as HMD device 110 of system 100 shown in FIG. 1. The HMD device including apparatus 700 may be coupled in communication with an embedded sensor object such as embedded sensor object 120 also shown in FIG. 1. Circuitry 720 may be arranged to execute one or more software or firmware implemented logic and/or features for real object and hand representation in VR content. It is worthy to note that "a" and "b" and "c" and similar designators as used herein are intended to be variables representing any positive integer. Thus, for example, if an implementation sets a value for a=2, then a complete set of software or firmware for components or logic 722-a may include logic 722-1 or 722-2. Also, "logic" and/or "features may be software/firmware stored in computer-readable media, and although the logic and features are shown in FIG. 7 as discrete boxes, this does not limit these elements of apparatus 700 to storage in distinct computer-readable media components (e.g., a separate memory, etc.).

According to some examples, circuitry 720 may include a processor or processor circuitry. The processor or processor circuitry can be any of various commercially available processors, including without limitation an AMD® Athlon®, Duron® and Opteron® processors; ARM® application, embedded and secure processors; IBM® and Motorola® DragonBall® and PowerPC® processors; IBM and Sony® Cell processors; Intel® Atom®, Celeron®, Core (2) Duo®, Core i3, Core i5, Core i7, Itanium®, Pentium®, Xeon®, Xeon Phi® and XScale® processors; and similar processors. According to some examples circuitry 720 may also include one or more application-specific integrated circuits (ASICs) and at least some logic 722-a may be implemented as hardware elements of these ASICs.

According to some examples, apparatus 700 may include a tracking logic 722. Tracking logic 722 may be executed by circuitry 720 to track one or more hands of a user of the HMD device that includes apparatus 700. For these examples, tracking logic 722 may be arranged to gather and maintain tracking information (e.g., in a data structure such as a lookup table (LUT)) associated with the tracking of the one or more user hands. The tracking information may be included in tracking information 710 and may include image data received from one or more cameras mounted on an outer service of a housing for the HMD device that includes apparatus 700.

In some examples, apparatus 700 may also include a representation logic 724. Representation logic 724 may be executed by circuitry 720 and as shown in FIG. 7 also includes a communication logic 724-1, an identification logic 724-2, a present logic 724-3, a sensor logic 724-4 and a match logic 724-5.

According to some examples, communication logic 724-1 may be capable of establishing a communication channel with an object having one or more embedded sensors. Identification logic 7242c may then receive identification information 705 via the established communication channel (e.g., a wireless communication channel). Identification information 705 may include an indication of number and types of embedded sensors the object may include and may also include information to indicate how the object may be represented in VR content presented to a user of the HMD device that includes apparatus 700.

In some examples, present logic 724-3 may receive tracking information forwarded from tracking logic 722 and identification information from communication logic 724-1. Present logic 724-3 may then cause the object and an image or representation of the one or more hands of the user to be presented in VR content visible to the user of the HMD device including apparatus 700. For these examples, presentation 730 may include that presentation of the object and the image or representation of the one or more hands in the VR content.

According to some examples, sensor logic 724-4 may receive sensor data from the one or more embedded sensors of the object that may indicate one or more object events. For example, an object event that indicates the object, at least temporarily, is not in direct contact with the one or more hands of the user. The sensor data may be included in sensor data 715.

In some examples, match logic 724-5 may use a database (e.g., maintained in a memory located at the HMD device including apparatus 700) to match hand tracking included in the tracking information maintained by tracking logic 722 with the one or more object events determined by sensor logic 724-4. The database may include real event to virtual event information that may enable match logic 724-5 to determine one or more inputs to modify the VR content visible to the user of the HMD device including apparatus 700. These one or more determined inputs may be included in input(s) 740.

Included herein is a set of logic flows representative of example methodologies for performing novel aspects of the disclosed architecture. While, for purposes of simplicity of explanation, the one or more methodologies shown herein are shown and described as a series of acts, those skilled in the art will understand and appreciate that the methodologies are not limited by the order of acts. Some acts may, in accordance therewith, occur in a different order and/or concurrently with other acts from that shown and described herein. For example, those skilled in the art will understand and appreciate that a methodology could alternatively be represented as a series of interrelated states or events, such as in a state diagram. Moreover, not all acts illustrated in a methodology may be required for a novel implementation.

A logic flow may be implemented in software, firmware, and/or hardware. In software and firmware embodiments, a logic flow may be implemented by computer executable instructions stored on at least one non-transitory computer readable medium or machine readable medium, such as an optical, magnetic or semiconductor storage. The embodiments are not limited in this context.

FIG. 8 illustrates an example of a logic flow 800. Logic flow 800 may be representative of some or all of the operations executed by one or more logic, features, or devices described herein, such as apparatus 700. More particularly, logic flow 800 may be implemented by one or more of tracking logic 722, representation logic 724 including communication logic 724-1, identification logic 724-2, present logic 724-3 or match logic 724-4.

According to some examples, logic flow 800 at block 802 may identify an object having one or more embedded sensors. For these examples, identification logic 724-2 may identify the object.

In some examples, logic flow 800 at block 804 may track one or more hands of a user wearing an HMD. For these examples, tracking logic 722 may track the one or more hands.

According to some examples, logic flow 800 at block 806 may present an image or representation of the one or more hands and the object in VR content visible to the user on the HMD based on identification of the object and the tracking of the one or more hands. For these examples, present logic 724-3 may present the image or representation of the one or more hand and the object in the VR content.

In some examples, logic flow 800 at block 808 may receive sensor data from the one or more embedded sensors that indicates the object, at least temporarily, is not in direct contact with the one or more hands. For these examples, sensor logic 724-4 of representation logic 724 may receive the sensor data.

According to some examples, logic flow 800 at block 810 may use the sensor data and tracking of the one or more hands to determine an input to cause the VR content visible to the user on the HMD to be modified. For these examples, match logic 724-5 may use the sensor data and tracking of the one or more hands to determine the input.

FIG. 9 illustrates an example storage medium 900. Storage medium 900 may include an article of manufacture. In some examples, storage medium 900 may include any non-transitory computer readable medium or machine readable medium, such as an optical, magnetic or semiconductor storage. Storage medium 900 may store various types of computer executable instructions, such as instructions to implement logic flow 800. Examples of a computer readable or machine readable storage medium may include any tangible media capable of storing electronic data, including volatile memory or non-volatile memory, removable or non-removable memory, erasable or non-erasable memory, writeable or re-writeable memory, and so forth. Examples of computer executable instructions may include any suitable type of code, such as source code, compiled code, interpreted code, executable code, static code, dynamic code, object-oriented code, visual code, and the like. The examples are not limited in this context.

Figure 10:
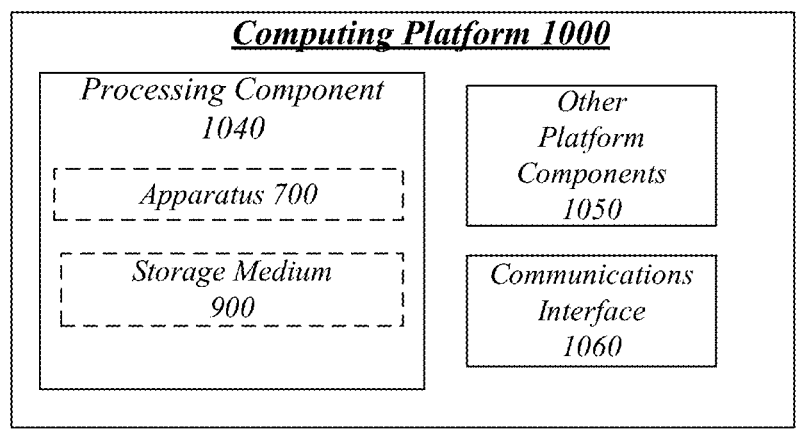
FIG. 10 illustrates an example computing platform.

FIG. 10 illustrates an example computing platform 1000. In some examples, as shown in FIG. 10, computing platform 1000 may include a processing component 1040, other platform components 1050 or a communications interface 1060. According to some examples, computing platform 1000 may be for an HMD device such as HMD device 110 of system 100 shown in FIG. 1.

According to some examples, processing component 1040 may execute processing operations or logic for apparatus 700 and/or storage medium 900. Processing component 1040 may include various hardware elements, software elements, or a combination of both. Examples of hardware elements may include devices, logic devices, components, processors, microprocessors, circuits, processor circuits, circuit elements (e.g., transistors, resistors, capacitors, inductors, and so forth), integrated circuits, application specific integrated circuits (ASIC), programmable logic devices (PLD), digital signal processors (DSP), field programmable gate array (FPGA), memory units, logic gates, registers, semiconductor device, chips, microchips, chip sets, and so forth. Examples of software elements may include software components, programs, applications, computer programs, application programs, device drivers, system programs, software development programs, machine programs, operating system software, middleware, firmware, software modules, routines, subroutines, functions, methods, procedures, software interfaces, application program interfaces (API), instruction sets, computing code, computer code, code segments, computer code segments, words, values, symbols, or any combination thereof. Determining whether an example is implemented using hardware elements and/or software elements may vary in accordance with any number of factors, such as desired computational rate, power levels, heat tolerances, processing cycle budget, input data rates, output data rates, memory resources, data bus speeds and other design or performance constraints, as desired for a given example.

In some examples, other platform components 1050 may include common computing elements, such as one or more processors, multi-core processors, co-processors, memory units, chipsets, controllers, peripherals, interfaces, oscillators, timing devices, video cards, audio cards, multimedia input/output (I/O) components (e.g., digital displays), power supplies, and so forth. Examples of memory units may include without limitation various types of computer readable and machine readable storage media in the form of one or more higher speed memory units, such as read-only memory (ROM), RAM, DRAM, DDR-RAM), SDRA, SRAM, programmable ROM (PROM), erasable programmable ROM (EPROM), EEPROM, flash memory, polymer memory such as ferroelectric polymer memory, ovonic memory, phase change or ferroelectric memory, SONOS memory, magnetic or optical cards, solid state memory devices (e.g., USB memory), solid state drives (SSD) and any other type of storage media suitable for storing information.

In some examples, communications interface 1060 may include logic and/or features to support a communication interface. For these examples, communications interface 1060 may include one or more communication interfaces that operate according to various communication protocols or standards to communicate over direct or network communication links. Direct communications may occur via use of communication protocols or standards described in one or more industry standards (including progenies and variants) such as those associated with the PCI Express or the USB specification. Network communications may occur via use of communication protocols, standards or specifications such those described in one or more Ethernet standards promulgated by IEEE (e.g., wired or wireless) or the Bluetooth specification.

The components and features of computing platform 1000 may be implemented using any combination of discrete circuitry, ASICs, logic gates and/or single chip architectures. Further, the features of computing platform 1000 may be implemented using microcontrollers, programmable logic arrays and/or microprocessors or any combination of the foregoing where suitably appropriate. It is noted that hardware, firmware and/or software elements may be collectively or individually referred to herein as "logic", "feature", "circuit" or "circuitry."

One or more aspects of at least one example may be implemented by representative instructions stored on at least one machine-readable medium which represents various logic within the processor, which when read by a machine, computing device or system causes the machine, computing device or system to fabricate logic to perform the techniques described herein. Such representations may be stored on a tangible, machine readable medium and supplied to various customers or manufacturing facilities to load into the fabrication machines that actually make the logic or processor.

Various examples may be implemented using hardware elements, software elements, or a combination of both. In some examples, hardware elements may include devices, components, processors, microprocessors, circuits, circuit elements (e.g., transistors, resistors, capacitors, inductors, and so forth), integrated circuits, ASICs, PLDs, DSPs, FPGAs, memory units, logic gates, registers, semiconductor device, chips, microchips, chip sets, and so forth. In some examples, software elements may include software components, programs, applications, computer programs, application programs, system programs, machine programs, operating system software, middleware, firmware, software modules, routines, subroutines, functions, methods, procedures, software interfaces, APIs, instruction sets, computing code, computer code, code segments, computer code segments, words, values, symbols, or any combination thereof. Determining whether an example is implemented using hardware elements and/or software elements may vary in accordance with any number of factors, such as desired computational rate, power levels, heat tolerances, processing cycle budget, input data rates, output data rates, memory resources, data bus speeds and other design or performance constraints, as desired for a given implementation.

Some examples may include an article of manufacture or at least one computer-readable medium. A computer-readable medium may include a non-transitory storage medium to store logic. In some examples, the non-transitory storage medium may include one or more types of computer-readable storage media capable of storing electronic data, including volatile memory or non-volatile memory, removable or non-removable memory, erasable or non-erasable memory, writeable or re-writeable memory, and so forth. In some examples, the logic may include various software elements, such as software components, programs, applications, computer programs, application programs, system programs, machine programs, operating system software, middleware, firmware, software modules, routines, subroutines, functions, methods, procedures, software interfaces, API, instruction sets, computing code, computer code, code segments, computer code segments, words, values, symbols, or any combination thereof.

According to some examples, a computer-readable medium may include a non-transitory storage medium to store or maintain instructions that when executed by a machine, computing device or system, cause the machine, computing device or system to perform methods and/or operations in accordance with the described examples. The instructions may include any suitable type of code, such as source code, compiled code, interpreted code, executable code, static code, dynamic code, and the like. The instructions may be implemented according to a predefined computer language, manner or syntax, for instructing a machine, computing device or system to perform a certain function. The instructions may be implemented using any suitable high-level, low-level, object-oriented, visual, compiled and/or interpreted programming language.

Some examples may be described using the expression "in one example" or "an example" along with their derivatives. These terms mean that a particular feature, structure, or characteristic described in connection with the example is included in at least one example. The appearances of the phrase "in one example" in various places in the specification are not necessarily all referring to the same example.

Some examples may be described using the expression "coupled" and "connected" along with their derivatives. These terms are not necessarily intended as synonyms for each other. For example, descriptions using the terms "connected" and/or "coupled" may indicate that two or more elements are in direct physical or electrical contact with each other. The term "coupled," however, may also mean that two or more elements are not in direct contact with each other, but yet still co-operate or interact with each other.

The follow examples pertain to additional examples of technologies disclosed herein.

Example 1. An example apparatus may include a tracking logic, at least a portion of which is in hardware, to track one or more hands of a user of a HMD. The apparatus may also include a representation logic, at least a portion of which is in hardware, the representation logic may include identification logic to identify an object having one or more embedded sensors. The representation logic may also include communication logic to receive tracking information for the one or more hands from the tracking logic. The representation logic may also include present logic to cause the object and an image or representation of the one or more hands to be presented in VR content visible to the user on the HMD based on the identification of the object and the tracking information. The representation logic may also include sensor logic to receive sensor data from the one or more embedded sensors that indicates the object, at least temporarily, is not in direct contact with the one or more hands. The representation logic may also include match logic use the sensor data and hand tracking included in the tracking information to determine one or more inputs to modify the VR content visible to the user on the HMD.

Example 2. The apparatus of example 1 may also include a wireless interface to receive identification information and the sensor data from the object via a wireless communication channel established with the object. For these examples, the identification logic may identify the object based on the identification information.

Example 3. The apparatus of example 2, the identification information may include an indication of a number and type of the one or more embedded sensors and an indication of how the object is to be presented in the VR content.

Example 4. The apparatus of example 1, the tracking logic may track the one or more hands via image data received from one or more cameras mounted on an outer surface of a housing for the HMD. For these examples, the image data may be included in tracking information forwarded to the communication logic.

Example 5. The apparatus of example 1, the one or more embedded sensors may include at least one of a motion sensor, a direction sensor, an audio sensor, an image sensor, a capacitive touch sensor, a proximity sensor or a pressure sensor.

Example 6. The apparatus of example 1, the match logic to determine the one or more inputs may include the match logic to determine that the sensor data indicates one or more object events. The representation logic may also match the one or more object events with the tracking of the one or more hands of the user based on using a database that includes real event to virtual event information to determine the one or more inputs to modify VR content visible to the user on the HMD.

Example 7. The apparatus of example 6, the one or more embedded sensors may include one or more capacitive touch sensors on a surface of the object to detect whether the one or more hands are in direct contact with the object. For these examples, the representation logic may also include the sensor logic to receive sensor data includes receiving sensor data from the one or more capacitive touch sensors indicating the object is not in direct contact with the one or more hands of the user. The representation logic may also include the match logic to determine that the sensor data from the one or more capacitive touch sensor indicates a first object event. The match logic may also use the database to match hand tracking included in the tracking information with the first object event to determine a first input to cause the VR content visible to the user on the HMD to be modified such that a first representation of the object presented in the VR content changes to a second representation.

Example 8. The apparatus of example 7, the one or more embedded sensors may include one or more motion or direction sensors to detect whether the object is moving or spinning around an axis running through the middle of the object. For these examples, the representation logic may also include the sensor logic to receive sensor data from the one or more motion or direction sensors that indicates the object is moving or spinning around the axis as the one or more capacitive touch sensor data indicates the object is not in direct contact with the one or more hands of the user. The representation logic may also include the match logic to determine that the sensor data from the one or more capacitive touch sensors and the one or more motion or direction sensors indicates a second object event. The match logic may also use the database to match hand tracking included in the tracking information with the first and second object events to determine a second input to modify the VR content visible to the user on the HMD such that a first representation of the object presented in the VR content changes to a third representation.

Example 9. The apparatus of example of example 6, the one or more embedded sensors may include one or more proximity sensors to detect whether the object is within a proximity of another object. For these examples, the representation logic may identify a second object. The representation logic may also include the sensor logic to receive sensor data includes receiving sensor data from the one or more proximity sensors that indicates the object is within a given proximity to the second object. The representation logic may also include the match logic to determine that the sensor data from the one or more proximity sensors indicates a first object event. The match logic may also use the database to match hand tracking included in the tracking information with the first object event to determining a first input to cause the VR content visible to the user on the HMD to be modified such that a first representation of the object presented in the VR content changes to a second representation.

Example 10. The apparatus of example 6, the one or more embedded sensors may include one or more pressure sensors to detect pressure on at least a portion of the object. For these examples, the representation logic may also include the sensor logic to receive sensor data includes receiving sensor data from the one or more pressure sensors indicating pressure on the portion of the object. The representation logic may also include the match logic determine that the sensor data from the one or more pressure sensors indicates a first object event. The match logic may also use the database to match hand tracking included in the tracking information with the first object event to cause the VR content visible to the user on the HMD to be modified such that a first representation of the object presented in the VR content changes to a second representation.

Example 11. The apparatus of example 1, the HMD may include a fully immersive HMD or a partially transparent HMD.

Example 12. An example method may include identifying, at a processor circuit, an object having one or more embedded sensors. The method may also include tracking one or more hands of a user wearing a HMD. The method may also include presenting an image or representation of the one or more hands and the object in VR content visible to the user on the HMD based on identification of the object and the tracking of the one or more hands. The method may also include receiving sensor data from the one or more embedded sensors that indicates the object, at least temporarily, is not in direct contact with the one or more hands. The method may also include using the sensor data and tracking of the one or more hands to determine an input to cause the VR content visible to the user on the HMD to be modified.

Example 13. The method of example 12, identifying the object may include receiving identification information from the object via a wireless communication channel established with the object.

Example 14. The method of example 13, the identification information may include an indication of a number and type of the one or more embedded sensors and an indication of how the object is to be presented in the VR content.

Example 15. The method of example 12, tracking the one or more hands may include tracking the one or more hands via one or more cameras mounted on an outer surface of a housing for the HMD.

Example 16. The method of example 12, the one or more embedded sensors may include at least one of a motion sensor, a direction sensor, an audio sensor, an image sensor, a capacitive touch sensor, a proximity sensor or a pressure sensor, receiving sensor data includes receiving the sensor data via a wireless communication channel established with the object.

Example 17. The method of example 12, the input may be determined based on determining that the sensor data indicates one or more object events. The input may also be determined based on matching the one or more object events with the tracking of the one or more hands of the user based on using a database that includes real event to virtual event information to determine one or more inputs to modify VR content visible to the user on the HMD.

Example 18. The method of example 17, the one or more embedded sensors may include one or more capacitive touch sensors on a surface of the object to detect whether the one or more hands are in direct contact with the object. The method may also include receiving sensor data includes receiving sensor data from the one or more capacitive touch sensors indicating the object is not in direct contact with the one or more hands of the user. The method may also include determining that the sensor data from the one or more capacitive touch sensor indicates a first object event. The method may also include using the database to match hand tracking included in the tracking information with the first object event to determine a first input to cause the VR content visible to the user on the HMD to be modified such that a first representation of the object presented in the VR content changes to a second representation.

Example 19. The method of example 18, the one or more embedded sensors including one or more motion or direction sensors to detect whether the object is moving or spinning around an axis running through the middle of the object. The method may also include receiving sensor data from the one or more motion or direction sensors indicating the object is moving or spinning around the axis as the one or more capacitive touch sensor data indicates the object is not in direct contact with the one or more hands of the user. The method may also include determining that the sensor data from the one or more capacitive touch sensors and the one or more motion or direction sensors indicates a second object event. The method may also include using the database to match hand tracking included in the tracking information with the first and second object events to determine a second input to modify the VR content visible to the user on the HMD such that a first representation of the object presented in the VR content changes to a third representation.

Example 20. The method of example of example 17 may also include identifying a second object, the one or more embedded sensors including one or more proximity sensors to detect whether the object is within a proximity of the second object. Receiving sensor data may include receiving sensor data from the one or more proximity sensors indicating the object is within a given proximity to the second object. The method may also include determining that the sensor data from the one or more proximity sensors indicates a first object event. The method may also include using the database to match hand tracking included in the tracking information with the first object event to determining a first input to cause the VR content visible to the user on the HMD to be modified such that a first representation of the object presented in the VR content changes to a second representation.

Example 21. The method of example 17, the one or more embedded sensors may include one or more pressure sensors to detect pressure on at least a portion of the object. Receiving sensor data may include receiving sensor data from the one or more pressure sensors indicating pressure on the portion of the object. The method may also include determining that the sensor data from the one or more pressure sensors indicates a first object event. The method may also include using the database to match hand tracking included in the tracking information with the first object event to cause the VR content visible to the user on the HMD to be modified such that a first representation of the object presented in the VR content changes to a second representation.

Example 22. The method of example 12, the HMD may include a fully immersive HMD or a partially transparent HMD.

Example 23. An example at least one machine readable medium may include a plurality of instructions that in response to being executed by system at a computing platform cause the system to carry out a method according to any one of examples 12 to 22.

Example 24. An apparatus may include means for performing the methods of any one of examples 12 to 22.

Example 25. An example at least one machine readable medium may include a plurality of instructions that in response to being executed by a system may cause the system to identify an object having one or more embedded sensors. The instructions may also cause the system to track one or more hands of a user wearing a HMD. The instructions may also cause the system to present the one or more hands and the object in VR content visible to the user on the HMD based on identification of the object and the tracking of the one or more hands. The instructions may also cause the system to receive sensor data from the one or more embedded sensors that indicates the object, at least temporarily, is not in direct contact with the one or more hands. The instructions may also cause the system to use the sensor data and tracking of the one or more hands to determine an input to cause the VR content visible to the user on the HMD to be modified.

Example 26. The at least one machine readable medium of example 25, the instructions to cause the system to identify the object may include the system to receive identification information from the object via a wireless communication channel established with the object.

Example 27. The at least one machine readable medium of example 25, the identification information may include an indication of a number and type of the one or more embedded sensors and an indication of how the object is to be presented in the VR content.

Example 28. The at least one machine readable medium of example 25, the instructions to cause the system to track the one or more hands may include the system to track the one or more hands via one or more cameras mounted on an outer surface of a housing for the HMD.

Example 29. The at least one machine readable medium of example 25, the one or more embedded sensors may include at least one of a motion sensor, a direction sensor, an audio sensor, an image sensor, a capacitive touch sensor, a proximity sensor or a pressure sensor, the system to receive sensor data includes the instructions to cause the system to receive the sensor data via a wireless communication channel established with the object.

Example 30. The at least one machine readable medium of example 25, the instructions to cause the system to determine the input based on the instructions may cause the system to determine that the sensor data indicates one or more object events. The instructions may also cause the system to match the one or more object events with the tracking of the one or more hands of the user based on use of a database that includes real event to virtual event information to determine one or more inputs to modify VR content visible to the user on the HMD.

Example 31. The at least one machine readable medium of example 30, the one or more embedded sensors including one or more capacitive touch sensors on a surface of the object to detect whether the one or more hands are in direct contact with the object. For these examples, the instructions to cause the system to receive sensor data may include the system to receive sensor data from the one or more capacitive touch sensors that indicates the object is not in direct contact with the one or more hands of the user. The instructions may further cause the system to determine that the sensor data from the one or more capacitive touch sensor indicates a first object event. The instructions may also cause the system to use the database to match hand tracking included in the tracking information with the first object event to determine a first input to cause the VR content visible to the user on the HMD to be modified such that a first representation of the object presented in the VR content changes to a second representation.

Example 32. The at least one machine readable medium of example 31, the one or more embedded sensors may include one or more motion or direction sensors to detect whether the object is moving or spinning around an axis running through the middle of the object. For these examples, the instructions to cause the system to receive sensor data may include the system to receive sensor data from the one or more motion or direction sensors that indicates the object is moving or spinning around the axis as the one or more capacitive touch sensor data indicates the object is not in direct contact with the one or more hands of the user. The instructions may further cause the system to determine that the sensor data from the one or more capacitive touch sensors and the one or more motion or direction sensors indicates a second object event. The instructions may also cause the system to use the database to match hand tracking included in the tracking information with the first and second object events to determine a second input to modify the VR content visible to the user on the HMD such that a first representation of the object presented in the VR content changes to a third representation.

Example 33. The at least one machine readable medium of example 30, the instructions may cause the system to identify a second object. For these examples, the one or more embedded sensors may include one or more proximity sensors to detect whether the object is within a proximity of the second object. The instructions to cause the system to receive sensor data may include the system to receive sensor data from the one or more proximity sensors indicating the object is within a given proximity to the second object. The instructions may further cause the system to determine that the sensor data from the one or more proximity sensors indicates a first object event. The instructions may also cause the system to use the database to match hand tracking included in the tracking information with the first object event to determining a first input to cause the VR content visible to the user on the HMD to be modified such that a first representation of the object presented in the VR content changes to a second representation.

Example 34. The at least one machine readable medium of example 30,the one or more embedded sensors may include one or more pressure sensors to detect pressure on at least a portion of the object. For these examples, the instructions to cause the system to receive sensor data may include the system to receive sensor data from the one or more pressure sensors indicating pressure on the portion of the object. The instructions may further cause the system to determine that the sensor data from the one or more pressure sensors indicates a first object event. The instructions may also cause the system to use the database to match hand tracking included in the tracking information with the first object event to cause the VR content visible to the user on the HMD to be modified such that a first representation of the object presented in the VR content changes to a second representation.

Example 35. The at least one machine readable medium of example 25, the HMD may include a fully immersive HMD or a partially transparent HMD.

Example 36. An example system may include an HMD. The system may also include a memory arranged to maintain a database that includes real event to virtual event information to match hand tracking with an object event to determine inputs to modify VR content. The system may also include a tracking logic, at least a portion of which is in hardware, to track one or more hands of a user of the HMD. The system may also include a representation logic, at least a portion of which is in hardware, the representation logic may include identification logic identify an object having one or more embedded sensors. The representation logic may also include communication logic to receive tracking information for one or more hands of the user from the tracking logic. The representation logic may also include present logic to cause the object and an image or representation of the one or more hands to be presented in VR content visible to the user on the HMD based on the identification of the object and the tracking information. The representation logic may also sensor logic to receive sensor data from the one or more embedded sensors that indicates one or more object events. The representation logic may also include match logic to use the database to match hand tracking included in the tracking information with the one or more object events to determine one or more inputs to modify the VR content visible to the user on the HMD.

Example 37. The system of example 36, the tracking logic may track the one or more hands via image data received from one or more cameras mounted on an outer surface of a housing for the HMD, the image data included in tracking information forwarded to the representation logic.

Example 38. The system of example 36 may also include a wireless interface to receive identification information and the sensor data from the object via a wireless communication channel established with the object. For these examples, the identification logic may identify the object based on the identification information.

Example 39. The system of example 38, the identification information may include an indication of a number and type of the one or more embedded sensors and an indication of how the object is to be presented in the VR content.

Example 40. The system of example 36, the one or more embedded sensors may include at least one of a motion sensor, a direction sensor, an audio sensor, an image sensor, a capacitive touch sensor, a proximity sensor or a pressure sensor.

Example 41. The system of example 36, the one or more embedded sensors may include one or more capacitive touch sensors on a surface of the object to detect whether the one or more hands are in direct contact with the object. For these examples, the representation logic may also include the sensor logic to receive sensor data from the one or more capacitive touch sensors that indicates the object is not in direct contact with the one or more hands of the user. The representation logic may also include the match logic to determine that the sensor data from the one or more capacitive touch sensor indicates a first object event. The match logic may also determine a first input to cause the VR content visible to the user on the HMD to be modified such that a first representation of the object presented in the VR content changes to a second representation based on the first object event being matched with the tracking of the one or more hands of the user.

Example 42. The system of example 41, the one or more embedded sensors may include one or more motion or direction sensors to detect whether the object is moving or spinning around an axis running through the middle of the object. For these examples, the representation logic may also include the sensor logic to receive sensor data from the one or more motion or direction sensors that indicates the object is moving or spinning around the axis as the one or more capacitive touch sensor data indicates the object is not in direct contact with the one or more hands of the user. The representation logic may also include a match logic to determine that the sensor data from the one or more capacitive touch sensors and the one or more motion or direction sensors indicates a second object event. The match logic may also use the database to match hand tracking included in the tracking information with the first and second object events to determine a second input to modify the VR content visible to the user on the HMD such that a first representation of the object presented in the VR content changes to a third representation based on the first and object events being matched with the tracking of the one or more hands of the user.

Example 43. The system of example 36, the representation logic may identify a second object. The one or more embedded sensors may include one or more proximity sensors to detect whether the object is within a proximity of the second object. For these examples, the representation logic may also include the sensor object to receive sensor data includes receiving sensor data from the one or more proximity sensors that indicates the object is within a given proximity to the second object. The representation logic may also include the match logic to determine that the sensor data from the one or more proximity sensors indicates a first object event. The match logic may also determine a first input to cause the VR content visible to the user on the HMD to be modified such that a first representation of the object presented in the VR content changes to a second representation based on the first object event being matched with the tracking of the one or more hands of the user.

Example 44. The system of example 36, the one or more embedded sensors may include one or more pressure sensors to detect pressure on at least a portion of the object. For these examples, the representation logic may also include the sensor logic to receive sensor data from the one or more pressure sensors that indicates pressure on the portion of the object. The representation logic may also include the match logic to determine that the sensor data from the one or more pressure sensors indicates a first object event. The match logic may also determine a first input to cause the VR content visible to the user on the HMD to be modified such that a first representation of the object presented in the VR content changes to a second representation based on the first object event being matched with the tracking of the one or more hands of the user.

Example 45. The system of example 36, the HMD may include a fully immersive HMD or a partially transparent HMD.

It is emphasized that the Abstract of the Disclosure is provided to comply with 37 C.F.R. Section 1.72(b), requiring an abstract that will allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in a single example for the purpose of streamlining the disclosure. This method of disclosure is not to be interpreted as reflecting an intention that the claimed examples require more features than are expressly recited in each claim. Rather, as the following claims reflect, inventive subject matter lies in less than all features of a single disclosed example. Thus the following claims are hereby incorporated into the Detailed Description, with each claim standing on its own as a separate example. In the appended claims, the terms "including" and "in which" are used as the plain-English equivalents of the respective terms "comprising" and "wherein," respectively. Moreover, the terms "first," "second," "third," and so forth, are used merely as labels, and are not intended to impose numerical requirements on their objects.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. An apparatus comprising:
   a processor; and
   a memory coupled to the processor, the memory comprising instructions that when executed by the processor cause the processor to:
   receive, from an object, an indication of a virtual representation of the object and an indication of a type of at least one sensor embedded in the object;
   send a control signal to a display of a head mounted display (HMD) to cause the display to present content including the virtual representation of the object and at least one hand of a wearer of the HMD, the content comprising virtual reality (VR) content;
   determine a position of the at least one hand of the wearer relative to the object;
   determine a pressure exerted by the at least one hand on the object;
   determine a movement of the at least one hand;
   match the movement and the pressure with an object event; and
   modify the content based on the object event and the position of the at least one hand of the wearer relative to the object.

2. The apparatus of claim 1, the memory comprising instructions that when executed by the processor cause the processor to:
   receive sensor data from the object, the sensor data including the indication of movement of the at least one hand of the wearer, wherein the sensor data including an indication of an object orientation; and
   modify the content based on the object orientation.

3. The apparatus of claim 2, the memory comprising instructions that when executed by the processor cause the processor to:
   determine a squeezing pressure exerted by the at least one hand on the object, wherein the sensor data including an indication that the object is in contact with the at least one hand; and
   modifying the content to depict the at least one hand in the act of squeezing the object and the object in the orientation and in contact with the at least one hand.

4. The apparatus of claim 2, the memory comprising instructions that when executed by the processor cause the processor to:
   receive an image;
   identify the at least one hand in the image; and
   modify the content based on the identified at least one hand.

5. The apparatus of claim 4, comprising a camera, the processor to receive the image from the camera.

6. The apparatus of claim 2, comprising an interface, the memory comprising instructions that when executed by the processor cause the processor to:
   establish, via the interface, a communication channel with the object; and
   receive one or more information elements from the object via the communication channel, at least one of the one or more information elements comprising the sensor data.

7. The apparatus of claim 6, the interface a wireless interface and the communication channel a wireless communication channel.

8. The apparatus of claim 1, comprising the display.

9. The apparatus of claim 8, wherein the display is partially transparent.

10. A method comprising:
receiving, from an object, an indication of a virtual representation of the object and an indication of a type of at least one sensor embedded in the object;
sending a control signal to a display of a head mounted display (HMD) to cause the display to present content including the virtual representation of the object and at least one hand of a wearer of the HMD, the content comprising virtual reality (VR) content;
determining a position of the at least one hand of the wearer relative to the object;
determining a pressure exerted by the at least one hand on the object;
determining a movement of the at least one hand;
matching the movement and the pressure with an object event; and
modifying the content based on the object event and the position of the at least one hand of the wearer relative to the object.

11. The method of claim 10, comprising:
receiving sensor data from the object, wherein the sensor data including the indication of movement of the at least one hand of the wearer and an indication of an object orientation; and
modifying the content based on the object orientation.

12. The method of claim 11, comprising:
determining a squeezing pressure exerted by the at least one hand on the object, wherein the sensor data including an indication that the object is in contact with the at least one hand; and
modifying the content to depict the at least one hand in the act of squeezing the object and the object in the orientation and in contact with the at least one hand.

13. The method of claim 11, comprising:
receiving an image from a camera coupled to the HMD;
identifying the at least one hand from the image; and
modifying the content based on the identified at least one hand.

14. The method of claim 13, comprising:
establishing, via an interface, a communication channel with the object; and
receiving one or more information elements from the object via the communication channel, at least one of the one or more information elements comprising the sensor data.

15. The method of claim 14, the interface a wireless interface and the communication channel a wireless communication channel.

16. At least one non-transitory machine readable medium comprising instructions that in response to being executed by a processor cause the processor to:
receive, from an object, an indication of a virtual representation of the object and an indication of a type of at least one sensor embedded in the object;
send a control signal to a display of a head mounted display (HMD) to cause the display to present content including the virtual representation of the object and at least one hand of a wearer of the HMD, the content comprising virtual reality (VR) content;
determine a pressure exerted by the at least one hand on the object;
determine a movement of the at least one hand;
determine a position of the at least one hand of the wearer relative to the object;
match the movement and the pressure with an object event; and
modify the content based on the object event and a position of the at least one hand of the wearer relative to the object.

17. The at least one non-transitory machine readable medium of claim 16, the medium comprising instructions that when executed by the processor cause the processor to:
receive sensor data from the object, the sensor data including an indication of the movement of the at least one hand of the wearer and an object orientation; and
modify the content based on the object orientation.

18. The at least one non-transitory machine readable medium of claim 17, the medium comprising instructions that when executed by the processor cause the processor to:
determine a squeezing pressure exerted by the at least one hand on the object, wherein the sensor data including an indication that the object is in contact with the at least one hand; and
modify the content to depict the at least one hand and the object in the orientation and in contact with the at least one hand.

19. The at least one non-transitory machine readable medium of claim 16, the medium comprising instructions that when executed by the processor cause the processor to:
receive an image;
identify the at least one hand in the image; and
modify the content based on the identified at least one hand.

20. The at least one non-transitory machine readable medium of claim 17, the medium comprising instructions that when executed by the processor cause the processor to:
establish, via a wireless interface coupled to the processor, a wireless communication channel with the object; and
receive one or more information elements from the object via the wireless communication channel, at least one of the one or more information elements comprising the sensor data.

21. The apparatus of claim 1, the memory comprising instructions that when executed by the processor cause the processor to send the control signal to the display of the HMD to cause the display to present the content including the virtual representation of the object and multiple hands of the wearer of the HMD, the multiple hands of the wearer including the at least one hand.

22. The method of claim 10, comprising sending the control signal to the display of the HMD to cause the display to present the content including the virtual representation of the object and multiple hands of the wearer of the HMD, the multiple hands of the wearer including the at least one hand.

23. The at least one non-transitory machine readable medium of claim 16, the medium comprising instructions that when executed by the processor cause the processor to send the control signal to the display of the HMD to cause the display to present the content including the virtual representation of the object and multiple hands of the wearer of the HMD, the multiple hands of the wearer including the at least one hand.

* * * * *